May 4, 1948.  C. J. JAHANT  2,441,071
PNEUMATIC TIRE AND METHOD OF MAKING SAME
Filed April 26, 1943   3 Sheets-Sheet 1
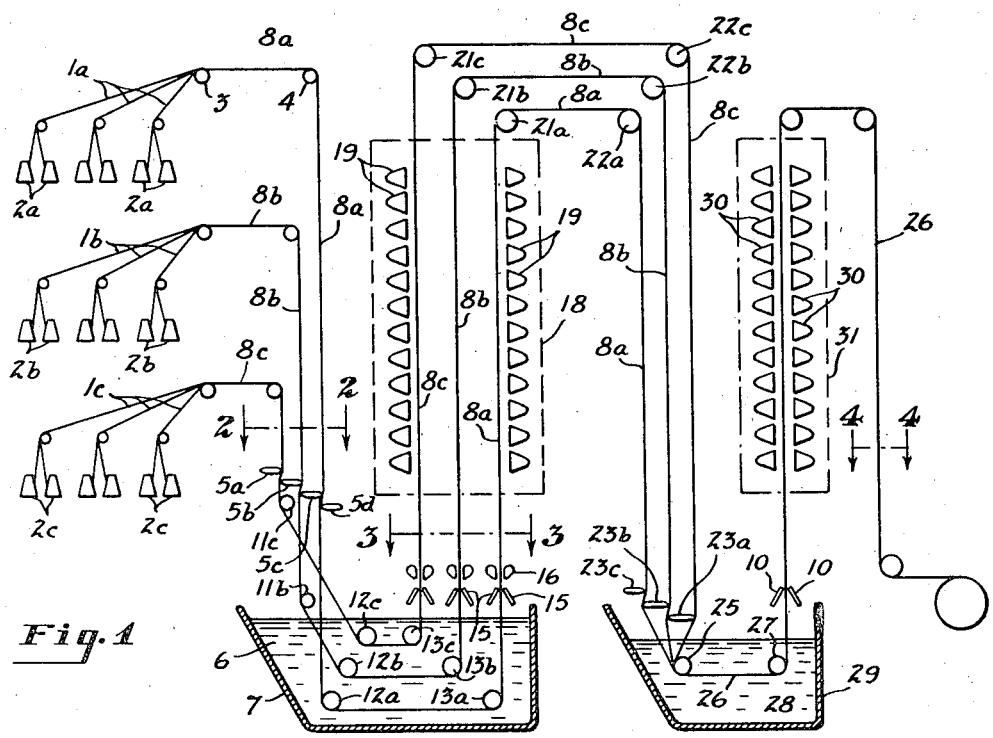
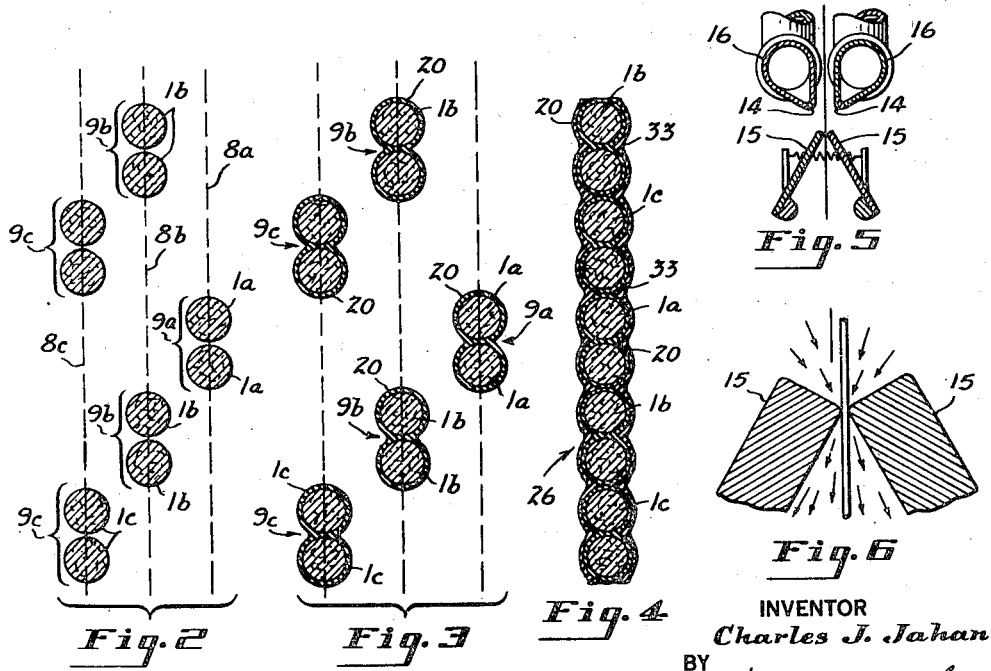
INVENTOR
Charles J. Jahant
BY Evans & McCoy
ATTORNEYS May 4, 1948. C. J. JAHANT 2,441,071
PNEUMATIC TIRE AND METHOD OF MAKING SAME
Filed April 26, 1943 3 Sheets-Sheet 2

INVENTOR
Charles J. Jahant
BY Evans & McCoy
ATTORNEYS

May 4, 1948.  C. J. JAHANT  2,441,071
PNEUMATIC TIRE AND METHOD OF MAKING SAME
Filed April 26, 1943  3 Sheets-Sheet 3

INVENTOR
Charles J. Jahant
BY
Evans + McCoy
ATTORNEYS

Patented May 4, 1948

2,441,071

UNITED STATES PATENT OFFICE 2,441,071

PNEUMATIC TIRE AND METHOD OF MAKING SAME

Charles J. Jahant, Akron, Ohio, assignor to The General Tire & Rubber Company, Akron, Ohio, a corporation of Ohio Application April 26, 1943, Serial No. 484,551

7 Claims. (Cl. 154—92)

This invention relates to improvements in pneumatic tires. It particularly relates to a method of making the flexible stretch-resistant carcass of such tires.

In my prior application Serial No. 256,698, filed February 16, 1939, Patent No. 2,331,323, issued October 12, 1943, of which this application is a continuation-in-part, there is disclosed a pneumatic tire having a carcass which has a plurality of superposed plies composed of a plurality of layers of substantially untwisted, relatively heavy synthetic filaments, which extend in substantially parallel relation from bead to bead of the tire.

In the manufacture of quantities of such tires it is almost essential to have the filaments closely arranged side by side in sheets of a suitable length. It is also usually essential to treat the filaments with a suitable adhesive capable of forming a good bond to the rubber separating the plies and surrounding the filaments.

Adhesives capable of forming a strong bond with synthetic filaments are, however, usually relatively hard or stiff materials when dry. Because of the stiffness of the adhesive and because it is desirable to have the adjacent filaments substantially in contact it is usually found, when a plurality of such filaments, such as a sheet or layer are treated as by dipping with a suitable adhesive capable of adhering the filaments to rubber, that the resulting sheet or layer upon drying usually becomes stiff and almost boardlike. It is difficult to use such boardlike fabric in the manufacture of vehicle tires as the filaments are not sufficiently resiliently connected to permit the variations in spacing and adjustments in tension when the tire is expanded from the flat band to normal toroidal shape. The flexibility of such sheets or layers of adhesives is also often impaired by the adhesive uniting filaments together in sheet form.

It is an object of the present invention to provide a method of making tire fabric comprising one or more layers of untwisted, parallel synthetic filaments, which fabric is flexible and characterized by showing a separation of the separate filaments or small groups of the separate filaments when tension is applied between the side edges of the fabric and transversely of the filaments.

It is another object to provide a method of making vehicle tires which contain flexible plies composed of substantially uniformly stressed and untwisted, relatively large diameter synthetic filaments, each adhered to rubber by a suitable rubber-to-filament adhesive.

It is another object to provide a method of making tire fabric having a plurality of substantially untwisted filaments arranged side by side, which fabric can be stretched in a direction perpendicular to the direction of said filaments to separate individual filaments or relatively small groups or ribbons of the same, so that when said fabric is utilized in a tire, adjustment in the spacing between the adjacent groups of filaments is permitted during expansion of the tire from flat band to annular shape and equalization of tension between the separate filaments may be had.

It is a further object to provide a pneumatic tire having a strong, relatively thin carcass containing a plurality of plies of substantially parallel, untwisted, relatively large synthetic filaments extending from bead to bead, which filaments or small groups of filaments are substantially equally stressed and are adhesively bonded to surrounding rubber.

It is another object to provide apparatus for making tire fabric comprising a plurality of substantially untwisted, relatively large parallel filaments having as a coating thereon a relatively thin layer of suitable rubber-to-filament adhesive which is capable of chemically bonding rubber to the surface of the filaments and having a superimposed coating of resilient rubber.

Other objects will be apparent from the following detailed description of the invention, as evidenced by the drawings, in which:

Figure 1 is a schematic, elevational view of apparatus which may be used to prepare tire fabric embodying the present invention showing the untwisted filaments in the various stages of treatment;

Figure 2 is an enlarged sectional view on the line 2—2 of Fig. 1;

Figure 3 is an enlarged sectional view on the line 3—3 of Fig. 1;

Figure 4 is an enlarged sectional view on the line 4—4 of Fig. 1;

Figure 5 is a schematic, elevational view, partly in section, through a portion of the apparatus shown in Fig. 1 for removing excess dipping or treating material from the filaments;

Figure 6 is an enlarged view of part of the apparatus shown in Fig. 5, showing schematically the direction of the air used for assisting in the removal of excess material from the filaments;

Figure 7:
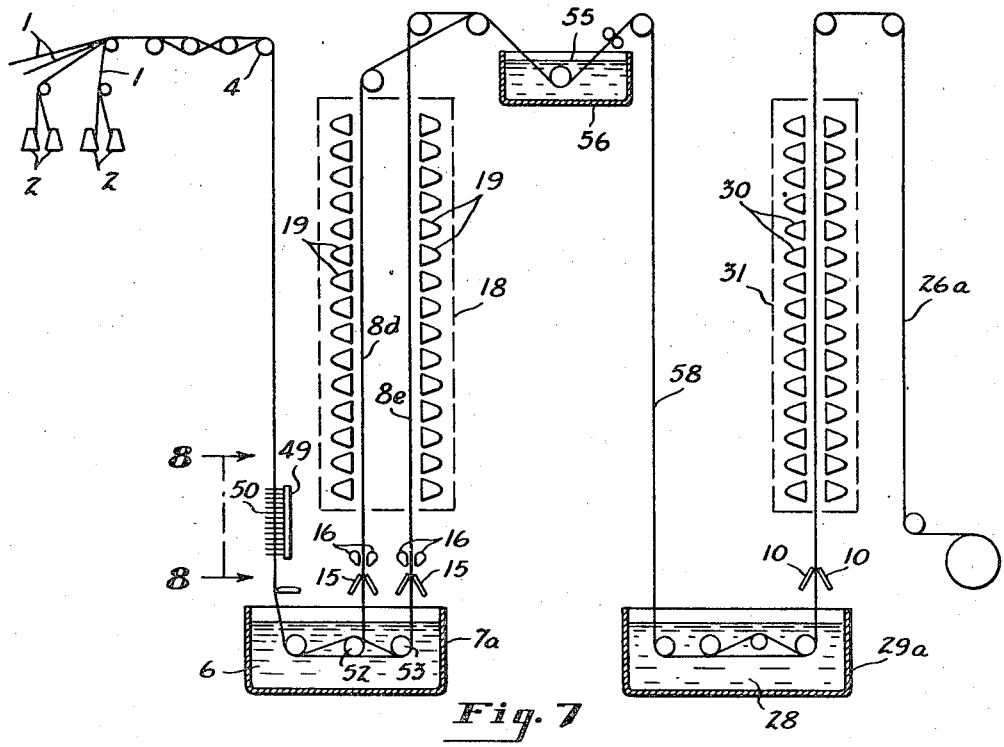
Figure 7 is a schematic, diagrammatic, elevational view of a modified form of apparatus which may be used to prepare ply material embodying the present invention.

In accordance with the present invention, the parallel synthetic filaments are treated or coated with a suitable adhesive capable of strongly adhering or bonding a rubberlike compound to the filament material under conditions such that the relatively hard adhesive material does not bridge across more than a few of the adjacent parallel filaments. The individual filaments, or fibrous units which are composed principally of a group of individual filaments adhered together or connected by the adhesive material, are then coated with a layer or film of stretchable or resilient plastic, compounded rubberlike material to form the filaments or units thereof into sheet form, such that it can be used as a material for forming the stretch resisting portions of the plies.

While it is preferred to have the individual filaments unconnected by the adhesive, when the units constituting a group of the filaments connected by the adhesive are not much greater than one-half inch or so, sufficient angular adjustment and sufficient separation of the fibrous units or ribbons may be had during the building and expansion of the tire to permit relatively uniform spacing of the units in the portion of the tire and to permit relatively uniform loading thereof, so that desirable utilization of stretch-resistant properties of fibrous material in a tire can be had.

Filaments having a diameter less than .004 inch are exceptionally difficult to process and maintain in parallel relation; a larger diameter than .004 inch is therefore desirable. Filaments having the largest possible diameter consistent with the relatively high flexibility required in pneumatic tires are preferred.

The maximum diameter of the filaments is dependent on the characteristics of the material, and with more resilient and more elastic materials, filaments of larger diameter may be produced. Synthetic filaments prepared from the cellulosic derivatives generally available preferably have a diameter corresponding to the hair of horses' tails, being about .006 or .008 of an inch.

With the filaments formed from some of the more recently developed linear polymers, such for example as the linear condensation product of polymethylene diamines with an aliphatic dicarboxylic acid, especially the linear condensation product of hexamethylene diamine and adipic acid (nylon), which have high elastic elongation, filaments of even larger diameter than .006 to .008 of an inch may be used.

An ordinary rubber cement does not bond to the surface of synthetic filaments and is, therefore, unsuitable for use in direct contact with the filaments. Many adhesives capable of bonding to the fibers and to rubber are known, however, and the adhesive used may be any of those capable of bonding rubber to the filament material under conditions of temperature encountered in the use of pneumatic tires. Suitable adhesives may be prepared as disclosed in any of the following patents—Church, 2,128,635 and 2,211,945; Hershberger, 2,211,948 to 2,211,951 and 2,224,679; Riehl, 2,247,923; 2,256,153 and 2,129,626; Lessig et al., 2,263,305 and 2,263,355; Crawford, 2,256,194; Humphrey, 2,262,608; Maney, 2,211,959; Meigs, 2,211,960; Tanberg, 2,211,969; Manchester, 2,188,283, and Nicol, 2,129,623. Especially desirable adhesives are dispersions of about equal parts of rubber and reclaimed rubber in about a 2% aqueous solution of casein preferably containing a small amount of a suitable dispersing agent. Soaps are deleterious to adhesion and should not be present in amounts greater than 1 or 2% of the composition. A particularly strong bond between rubber compounds and synthetic filaments is obtained with an adhesive prepared from the following ingredients in which the parts are by weight:

| | Parts |
|---|---|
| 2% aqueous ammoniac casein solution | 80 |
| Whole tire reclaimed rubber | 10 |
| Smoked sheet | 10 |
| Wetting agent (Santomerse) | .5 |

The rubber and reclaim are first thoroughly masticated together on a mill and then transferred to a suitable mixer where the solution of the casein and wetting agent are added a little at a time until reversion of the emulsion takes place. The emulsion formed is then homogenized by treatment in a colloid mill to reduce particle size and improve its properties.

Referring more particularly to the drawings, in which like parts are indicated by like numerals of reference throughout the several views, the filaments 1, which are drawn from a suitable source such as a creel containing the spools 2, and the guide bars 3 and 4, are passed in a parallel manner between suitable spacer bars 5 into a suitable adhesive 6 contained in the coating vessel 7, where substantially the entire surface of the filaments 1 comes in contact with the adhesive material. Since the individual filaments usually have a very small diameter and since to get the required strength within small volume, it is almost essential that they be maintained in parallel relation with the adjacent filaments almost in contact with each other, it is not usually practical to space the filaments by a comb having teeth between each of the adjacent filaments as is done in the case of twisted cords and in the manufacture of weak weft or weftless cord tire fabric.

In order to obtain the desired compactness or concentration of filaments and yet control their position during treatment, it is desirable to form sheets of contiguous parallel filaments or fibrous units from a plurality of sheets having the fibrous units, which contain one or more parallel filaments, in offset spaced relation. Thus, as shown in Fig. 1, filaments 1a may be drawn from the spools 2a to form the sheets 8a having the units 9a composed of a plurality of filaments 1a in spaced relation and passing between the guide bars 5c and 5d. The sheets of filaments 8b are formed by the units 9b of filaments 1b drawn from the spools 2b. The sheet 8c is formed from spaced units 9c formed from the filaments 1c drawn from the spools 2c. The units 9 (one or more filaments) in each of the sheets 8a, 8b and 8c are offset to each other.

The sheets 8 after passing between the respective spacing and tensioning bars 5 as illustrated are directed over intersecting paths into a dipping chamber 7. The units in each of the sheets 8a, 8b and 8c serve as spacers for the units in the other sheets. Thus, the sheet 8c which passes under the guides 11c and 12c intersects with sheets 8a and 8b. Sheet 8b which passes under the guides 11b and 12b intersects with sheets 8c and 8a, which latter is guided by 12a. The filamentary units 9a, 8b and 9c thus maintain each other in offset spaced relation, illustrated in Figs. 2 and 3 of the drawing.

The sheets 8a, 8b and 8c having the fibrous units 9 in offset and spaced relation are passed under the immersion guides 13a, 13b and 13c respectively, which are arranged in such manner that sheets 8a, 8b and 8c, after being coated with adhesive, emerge from the dipping tank in spaced relation.

Means such as flexible wiping blades 15 and an air blast from slits 14 in the tubes or conduits 16 are provided for removing substantially all of the excess adhesive material 6 from the coated filamentary units 9 of the sheets 8a, 8b and 8c. The coated sheets 8a, with the excess adhesive material removed, are dried by passage through a suitable drier 18 which preferably contains a plurality of infra red lamps 19 arranged so as to rapidly remove volatile matter from the coatings 20 deposited on the filaments 1 from the adhesive 6.

From the drier 18 the sheets 8 are passed successively over appropriate guides 21 and 22 and into suitable contact with the toothed guide bars 23. The bars 23 are suitably arranged to maintain the alignment of the units 9 of the various sheets 8 in offset relation with spaces of one of the sheets opposite the coated fibrous units in the other sheets; thus, when the sheets 8 are superimposed by passage under the guide bar 25, the units 9 are arranged in a single plane with the filaments 1 substantially side by side and in contiguous parallel relation, as shown in Fig. 4. The guides 25 and 27 are arranged so that at least their lower surface portions are below the level of the liquid 28 in the coating tank 29.

The liquid 28 is preferably an aqueous dispersion of a rubber or of a rubberlike polymer, such for example as a natural or a synthetic rubber latex containing the desired amount of compounding reagents. The dipping tank 29 which with the guide 25 and the dispersion 28 serves as means for applying a connecting film or layer of a resilient, preferably uncured, rubber compound in contact with the coated units 9, may be substituted by other applying means, such for example as a calender if desired to apply a layer of rubber compound over the coated filaments.

After passage beneath the guide 27, the composite sheet is withdrawn from the liquid 28 between suitable means such as the scraper blades 10 for removing excess rubbery material from the outer surfaces of the composite sheet. The volatile matter, for example, water, may then be removed from the rubbery compound by suitable means, such as infra red lamps 30 within a drier 31.

The film of rubberlike material 33 formed from the rubberlike material of the liquid 28 overlies the adhesive coating 20 on the filaments 1 and unites the coated units 9 into a composite sheet, shown in Fig. 4. Since only the filaments 1 within the respective units 9 are adhered together through the relatively hard adhesive coating 20, stretching of the composite sheet 26 by applying tension to the side edges of the sheet transversely of the filaments 1 will cause lateral separation of the respective units 9. It is thus seen that in the building of tires, facilities are thereby provided for permitting adjustments in the spacing between portions of respective filamentary units 9 as the tire is expanded from the band to toroidal shape in conventional manner.

In pneumatic tires which utilize a plurality of plies of stretch-resistant elements, the stretch resistant elements in adjacent plies are disposed in angular relation to each other with the elements of each ply extending continuously between and around the beads of the tire. In the flexing of such tires, considerable angular movement between the elements and the separate plies is encountered and it is, therefore, necessary to provide relatively heavy layers of rubber between the fibrous elements to permit flexing without separation of the adjacent plies from each other. With filaments in parallel relation instead of in the highly twisted state as in the conventional tire, stresses in the filament are in the direction of the load. Therefore, a smaller filamentary area is required for a given reinforcing effect than is the case with twisted filaments. However, since the filaments are usually considerably smaller than the conventional tire cords, many more filaments are required than cords. If only a single layer of filaments is present in each ply, the relatively heavy layer of rubber between the plies would necessitate the formation of thicker rather than the desired thinner tires. It is, therefore, almost essential in order to obtain a thin, strong tire carcass that a plurality of layers of untwisted filaments be arranged in each ply.

The plies or ply material for such plies may be prepared by superimposing a plurality of layers or sheets 26, set forth above, such layers or sheets consisting of a plurality of filamentary units, arranged in sheet form and in contact with the rubbery film or layer 33; which facilitates maintenance of the units in sheet form. The units 9 consist of single filaments or relatively narrow ribbons of a plurality of filaments, say 1 or 2 to 100, and preferably less than 10 or 15 filaments, coated with or bonded together through a film of the relatively hard adhesive 20.

Figure 10:
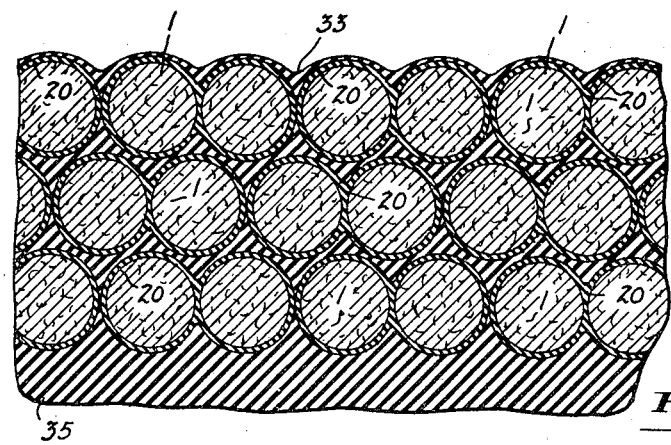
Figure 10 is an enlarged cross sectional view of a portion of ply material embodying the present invention.
Figure 11:
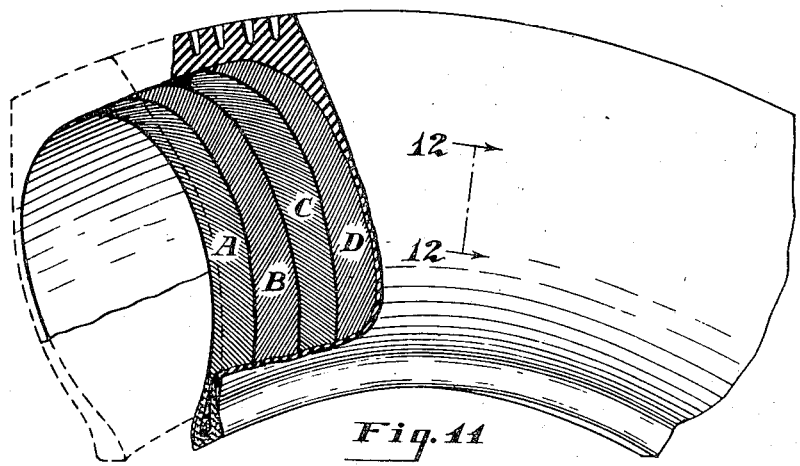
Figure 11 is a perspective view of a portion of a tire embodying the present invention, with parts broken away to show the construction and arrangement of plies.
Figure 12:
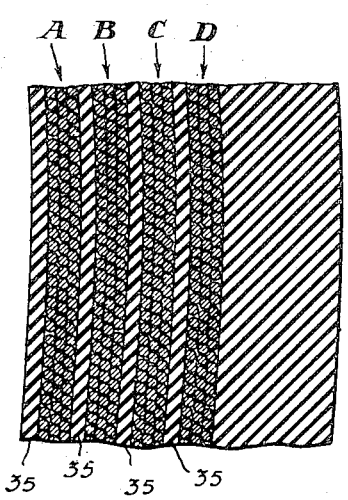
Figure 12 is a cross sectional view on the line 12—12 of Fig. 11.

Referring particularly to Figs. 10, 11 and 12, the preferred form of pneumatic tire may comprise a plurality of plies having stress resisting portions respectively A, B, C and D, etc., each of which may consist essentially of a plurality of layers 26 of untwisted synthetic filamentary units 9 extending continuously between the opposite beads of the tire and adhered together through a coating 33 of rubberlike material. The filaments 1 of each of the units 9 are substantially parallel to the other filaments. The filamentary units of adjacent plies are in angular relation to each other and the stress-resisting portions of adjacent plies are separated by a relatively heavier layer of a rubbery compound 35.

Figure 8:
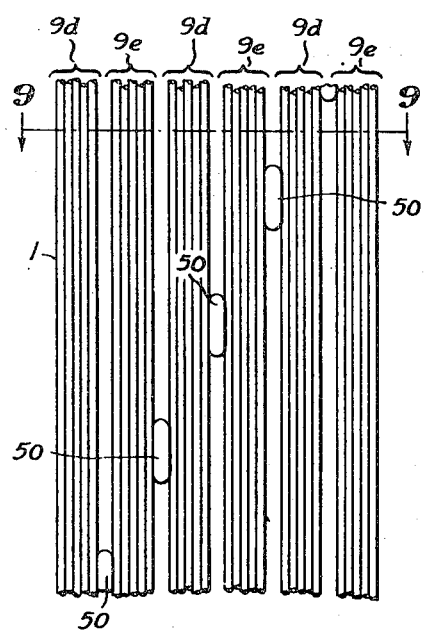
Figure 8 is a fragmentary elevational view of the filaments and spacing device as viewed from the line 8—8 of Fig. 7.
Figure 9:
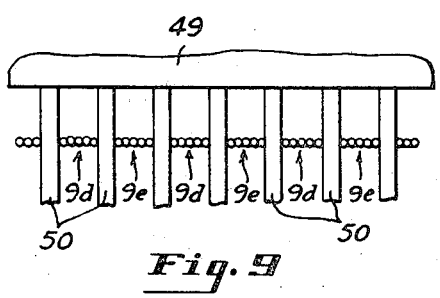
Figure 9 is a sectional view on the line 9—9 of Fig. 8.

In the production of tire fabric, in accordance with Figs. 7, 8 and 9, the filaments 1 are drawn from the spools 2 of the creel over the bar 4 and disposed in ribbonlike filamentary units having a plurality of filaments 1a in parallel relation by the aid of teeth 50 of a comb 49. The alternate units 9, after having the individual filaments thereof wetted with the adhesive liquid 6, such as one of those above set forth and contained within the tank 7a, are separated by the bars 52 and 53 respectively into sheets 8d and 8e, in which the units 9 are disposed in offset relation to each other (i. e., the units in 8d are opposite spaces in 8e). After the excess liquid has been removed by the drier 18, the sheets 8d and 8e are united so that all the filamentary units are in contiguous relation in a single plane to form a composite sheet which may, if desired, be treated with a suitable liquid latex coagulant 55 within the coagulating tank 56. The coagulant 55 selected may be an electrolyte of a type that does not injure the filamentary material. The sheet 58 of filamentary units 9 is then preferably coated with a heavy aqueous dispersion of a rubberlike material by passing it into the aqueous dispersion 28 within a tank 29a. Excess uncoagulated liquid may be removed by the blades 10. The water is removed by the drier 31 to form sheet 26a having the units 9d and 9e adhered through a film of compounded rubber.

As pointed out above, the filaments in the tires of the present invention are substantially untwisted, that is, they are not twisted together to such an extent that the angle beween the filaments and the general direction of the entire filamentary unit becomes appreciably greater than a few degrees, say 2 or 3 degrees. Frequently, in the winding or removal of filaments from spools, a slight twist is imparted to the filaments; such a twist is of course of low angularity and does not appreciably weaken the filaments by displacing their direction or the direction of their crystal axis orientation with respect to the direction of load applied to the entire filamentary unit, as is done in the case of twisted cords. Such filaments may, therefore, be considered to be substantially untwisted and within the meaning of this term as used in the appended claims.

It is to be understood that variations and modifications of the specific process, product and apparatus herein shown and described for purposes of illustration may be made without departing from the spirit of the invention. It is intended that the invention be limited only by the appended claims.

What I claim is:

1. In the method of making pneumatic tires the steps which comprise forming relatively narrow fiber units by arranging a plurality of relatively large diameter, substantially untwisted synthetic filaments in side by side relation so that each filament is adjacent another filament, coating the filaments with an adhesive solution capable of forming a bond between a rubber compound and the fibrous material and drying the coating to connect the filaments together in substantially untwisted form, the coated and dried filaments being formed into units one filament thick, arranging a plurality of separate units thus formed in contiguous side by side relation to form sheets having said units extending continuously between two opposite ends thereof, coating the sheets of contiguous units with a compounded aqueous dispersion of a rubberlike material capable of forming after drying a resilient rubber compound, drying the coating on the units to form a layer of rubber which connects the fibrous units together, and forming tire plies having the substantially untwisted filaments of the coated sheets thus formed as the main stretch-resisting elements.

2. In the method of making pneumatic tires the steps which comprise forming relatively narrow fiber units by arranging a plurality of relatively large diameter, substantially untwisted synthetic filaments in side by side relation, coating the filaments with an adhesive solution containing casein and an aqueous dispersion of a rubber and capable of forming a bond between a rubber compound and the fibrous material and drying the coating to connect the filaments together by said coating and in untwisted relationship, the coated and dried filaments being formed into units one filament thick, arranging a plurality of the units thus formed in contiguous side by side relation to form sheets, coating the sheets of contiguous units with a compounded aqueous dispersion of a rubberlike material capable of forming after drying a resilient rubber compound, drying the coating on the units to form a layer of rubber which connects the fibrous units together, and forming tire plies having the substantially untwisted filaments of the coated sheets thus formed as the main stretch-resisting elements.

3. In a method of making pneumatic tires having a carcass comprising a plurality of plies separated by interposed layers of rubber and containing substantially untwisted synthetic filaments arranged side by side and extending between the beads of the tire, the steps which comprise preparing a plurality of sheets, each having a plurality of spaced groups of substantially untwisted filaments in side by side relation with each filament closely adjacent another, the groups in the separate sheets being in offset relation to the groups in the other sheets, coating the filaments in each of the sheets with an adhesive suitable for adhering a rubber compound to the material of said filaments, drying the coating on the filaments of said sheets, thereby connecting only filaments in each of said separate groups to form sheets of spaced unconnected fibrous units one filament thick, superposing the sheets of spaced units to form a sheet having the units in substantially contiguous relation, treating the sheet of contiguous units thus formed with a rubber compound to form a film in contact with the coated surface of said units and connecting said units together in sheet form, and superposing a plurality of such resiliently connected sheets to form tire plies, the fibrous units extending continuously between two opposite ends of said sheet.

4. In the method of making pneumatic tires having a plurality of plies with stress-resisting elements extending continuously between the opposite beads thereof, the steps which comprise disposing a plurality of substantially untwisted filaments closely adjacent to each other, forming a coating of a material capable of adhering to said filaments and to resilient rubber over filaments thus disposed, which coating on adjacent filaments overlaps to form said filaments and said coating into a fiber unit having filaments in substantially untwisted relation and one filament thick, arranging a plurality of such relatively small fiber units in side by side sheetlike relation, applying a film of uncured resilient rubber compound to said units so arranged and in contact with the surface of said units to connect said units together in sheet form having said units extending continuously between two opposite edges thereof, and superimposing a plurality of sheets thus formed with the fibers in parallel relation to form a ply having a plurality of layers of said fibrous units as stretch-resisting elements.

5. In the method of making pneumatic tires having a plurality of plies with stress-resisting elements extending continuously between the opposite beads thereof, the steps which comprise disposing a plurality of substantially untwisted filaments closely adjacent to each other, forming a coating of a material capable of adhering to said filaments and to resilient rubber over the filaments thus disposed, which coating on adjacent filaments overlaps to form said filaments and said coating into a fiber unit having filaments in substantially untwisted relation and being one filament thick, arranging a plurality of such relatively small fiber units in side by side sheetlike relation, forming over contiguous units so arranged a coating of a compounded aqueous dispersion of a rubberlike material capable of forming after drying a resilient rubber compound, drying the coating on the units to form a layer of rubber connecting the fibrous units together, said units extending continuously between two opposite edges of said layer, and forming tire plies having the substantially untwisted filaments of the coated sheets thus formed as the main stretch-resisting elements.

6. In a method of making pneumatic tires having a plurality of plies of stress-resisting elements extending continuously between the opposite beads thereof, the steps which comprise forming a sheet comprising a web of uncured resilient rubber compound and a plurality of relatively small fiber units in side by side relation, and united together by said web, said units containing a plurality of substantially untwisted filaments and carrying a coating of adhesive capable of strongly adhering resilient rubber to the surface of the fibers, said units being only one filament thick, said coating being substantially continuous with said units and uniting said filaments together but being unattached to other units, so that resilient change in spacing between adjacent units may occur in portions of said tires when flexure occurs, said film connecting said units together in sheet form, said units extending continuously between two opposite edges of said film, and superimposing a plurality of sheets thus formed with the fibers in parallel relation to form a ply having a plurality of layers of said fiber units.

7. In a method of making pneumatic tires having a plurality of plies of stress-resisting elements extending continuously between the opposite beads thereof, the steps which comprise forming a sheet comprising a film of uncured resilient rubber compound and a plurality of relatively small fiber units in side by side relation and united by said film, said units containing a plurality of substantially untwisted filaments and carrying a coating of adhesive capable of strongly adhering resilient rubber to the surface of the fibers, said units being one filament thick, said coating being substantially continuous with said units and constituting sole means uniting said filaments of said individual units together but being unattached to other units, so that resilient change in spacing between adjacent units may occur in portions of said tires when flexure occurs, said film connecting said units together in sheet form, and said units extending continuously between two opposite edges of said film.

CHARLES J. JAHANT.

REFERENCES CITED

The following references are of record in the file of this patent:

UNITED STATES PATENTS

| Number | Name | Date |
|---|---|---|
| 539,224 | Huss | May 14, 1895 |
| 558,689 | Huestis | Apr. 21, 1896 |
| 1,453,865 | Dickinson | May 1, 1923 |
| 1,488,048 | Hopkinson | Mar. 25, 1924 |
| 1,624,615 | Midgley | Apr. 12, 1927 |
| 1,657,830 | Hopson | Jan. 31, 1928 |
| 2,098,038 | Hazell et al. | Nov. 2, 1937 |
| 2,125,224 | Charch et al. | Aug. 30, 1938 |
| 2,317,911 | Hoff | Apr. 27, 1943 |
| 2,331,323 | Jahant | Oct. 12, 1943 |